Figure 1:
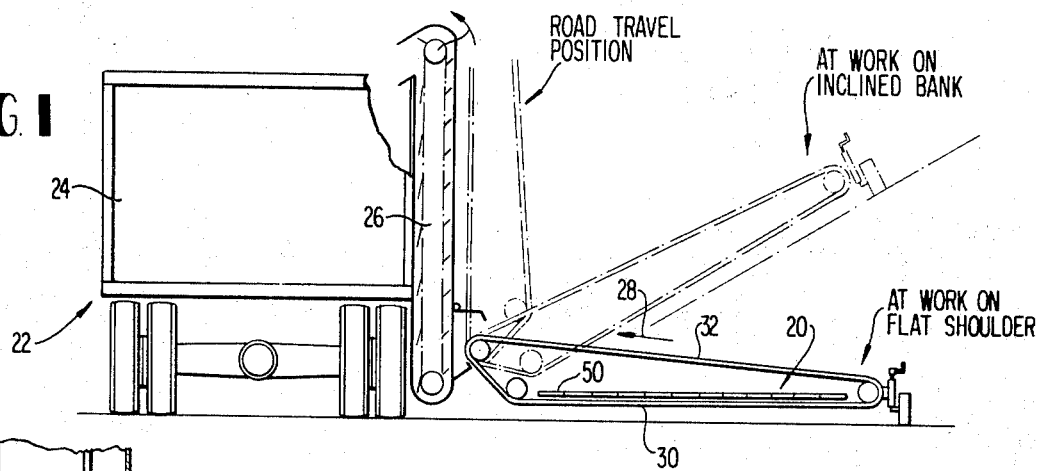

United States Patent [19]
Baker

[11] 3,709,360
[45] Jan. 9, 1973

[54] MECHANIZED COLLECTION OF SOLID WASTE MATERIAL

[76] Inventor: Raymond N. Baker, 2233 Wisconsin Avenue, N. W., Washington, D.C. 20007

[22] Filed: Jan. 15, 1971

[21] Appl. No.: 106,733

[52] U.S. Cl. ...................209/215, 209/218, 15/3, 198/41
[51] Int. Cl. .............................................C10g 23/02
[58] Field of Search .........198/7, 41; 214/42; 15/1.5, 15/220 A, 339, 3; 209/212–217, 218, 219, 225, 226, 227, 223; 56/322, 296, 329, 28, 192

[56] References Cited

UNITED STATES PATENTS

| | | | |
|---|---|---|---|
| 3,232,408 | 2/1966 | Asbury | 198/7 |
| 2,873,843 | 2/1959 | Wilson | 198/41 |
| 3,430,425 | 3/1969 | Pool et al. | 56/329 |
| 3,210,121 | 10/1965 | Struven | 209/218 X |
| 3,164,940 | 1/1965 | Gray | 56/28 |
| 1,759,687 | 5/1930 | Carter | 209/215 |
| 3,084,495 | 4/1963 | Blackerby | 56/255 |
| 3,185,285 | 5/1965 | Runco et al. | 198/41 X |
| 3,214,002 | 10/1965 | Kirkpatrick et al. | 56/192 X |
| 2,812,630 | 11/1957 | Elfes | 56/322 X |
| 2,836,953 | 6/1958 | van der Lely et al. | 56/322 X |

*Primary Examiner*—Russell R. Kinsey
*Attorney*—Shanley & O'Neil

[57] ABSTRACT

Provision is made for mechanized collection of solid waste materials along highways and the like by use of endless-belt type magnetic conveyors, operable in conjunction with trucks, tractors, grass cutters and other roadside maintenance vehicles. Enchanced retrieval results from articulation of the conveyor arm and use of cyclically operative electromagnets. Methods are provided for making glass, paper laminates, and the like magnetizable by inclusion of magnetic material during manufacture or fabrication.

12 Claims, 14 Drawing Figures

PATENTED JAN 9 1973 3,709,360

SHEET 1 OF 3

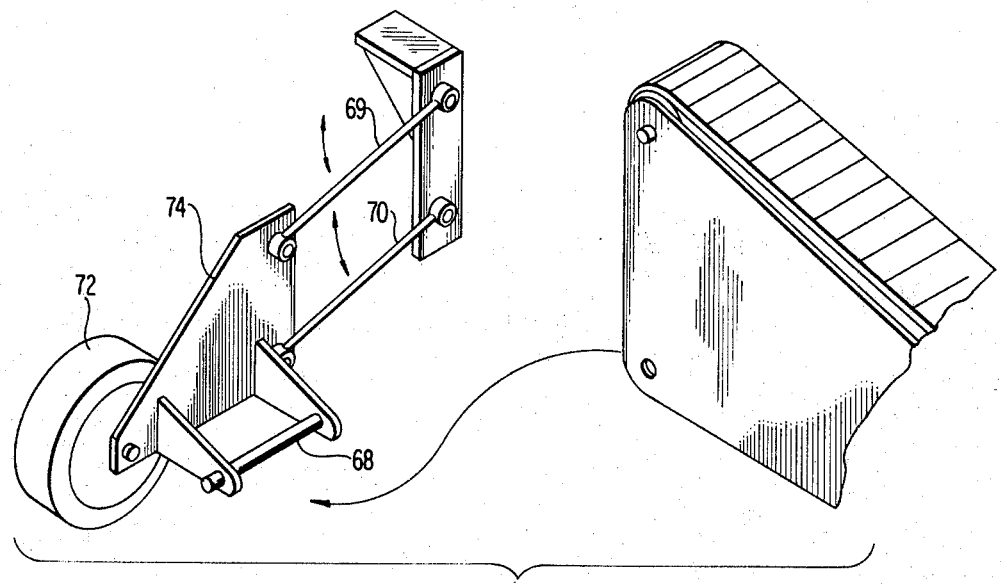
FIG. 5
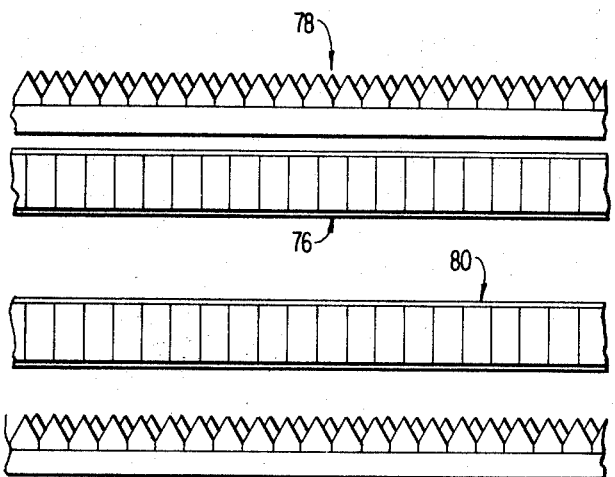
FIG. 6
FIG. 7
FIG. 8
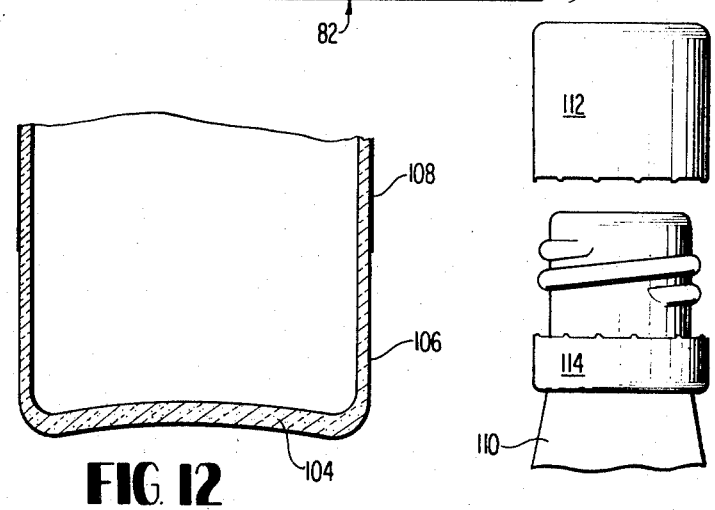
FIG. 12
FIG. 13

MECHANIZED COLLECTION OF SOLID WASTE MATERIAL

This invention is concerned with mechanized collection of solid waste materials such as cans, container litter, and the like.

Technology exists for separation and reprocessing of most solid waste materials, but a major obstacle to practical environmental cleanup endeavors has been the lack of an automated retrieval or mechanized approach to collection of litter. At present there are no satisfactory automated methods for clean up of the roadsides and countryside. Also, no retrieval system exists which is geared to the volume operations made available by primary and secondary metal processors for processing solid waste materials. In brief, a major obstacle to meaningful environmental clean up has been that retrieval technology has not matched processing capacity for waste materials.

It is a primary objective of the present invention to provide the mechanized retrieval technology to make environmental clean up of solid waste materials, such as metal cans and other container materials, practicable and economic.

Approaches to carry out this objective will be more evident from a description of physical embodiments of the invention represented by the accompanying drawings.

Figure 2:
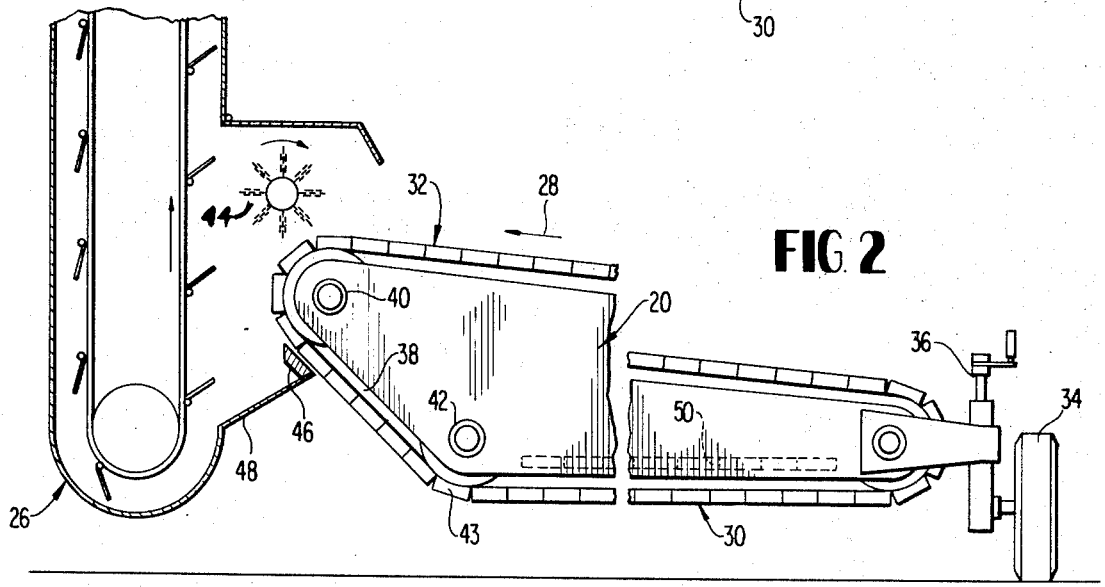
Figure 3:
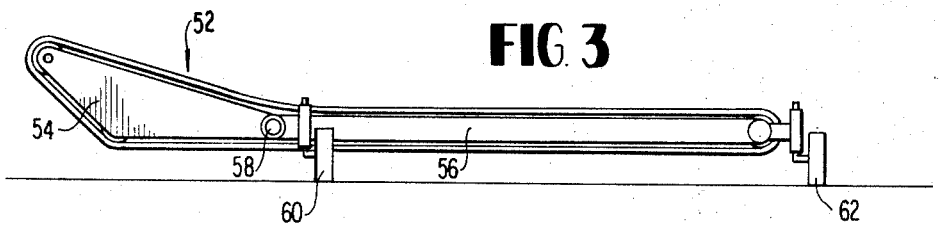
Figure 4:
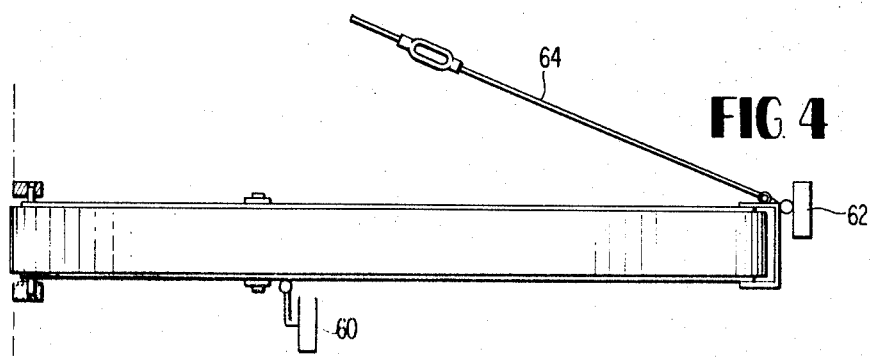
Figure 10:
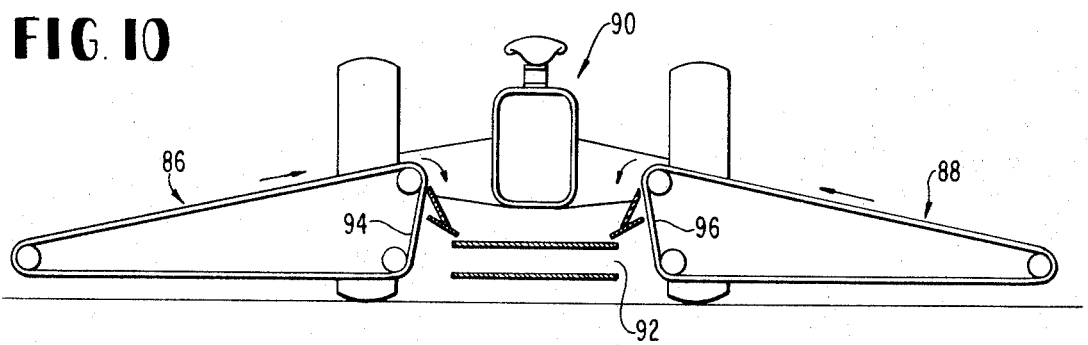
Figure 9:
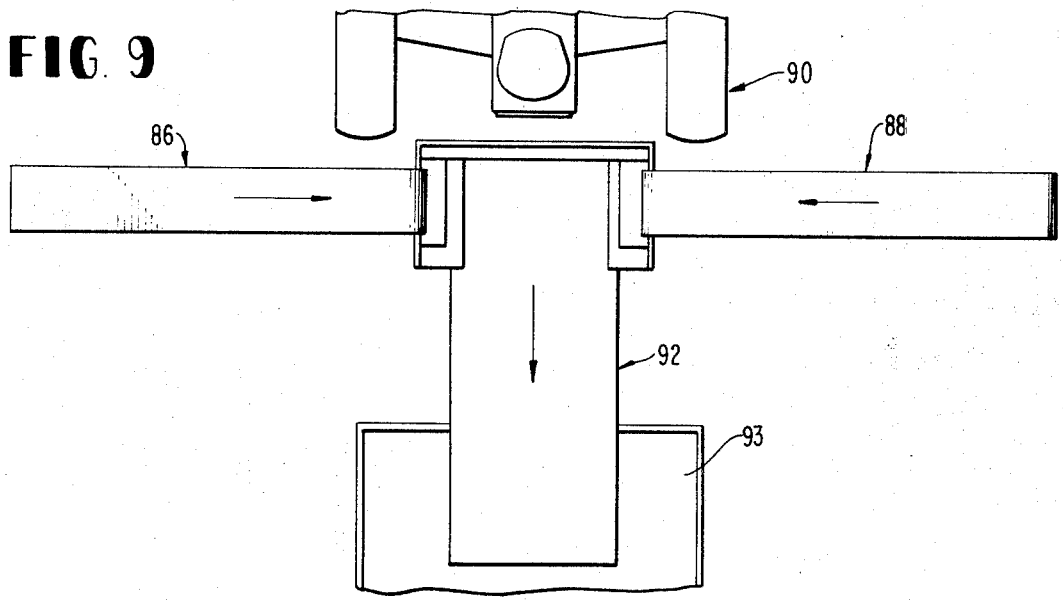
Figure 14:
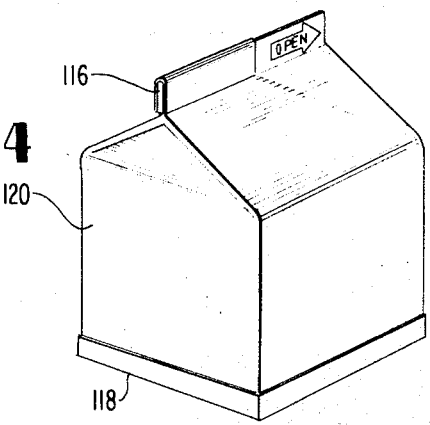
Figure 11:
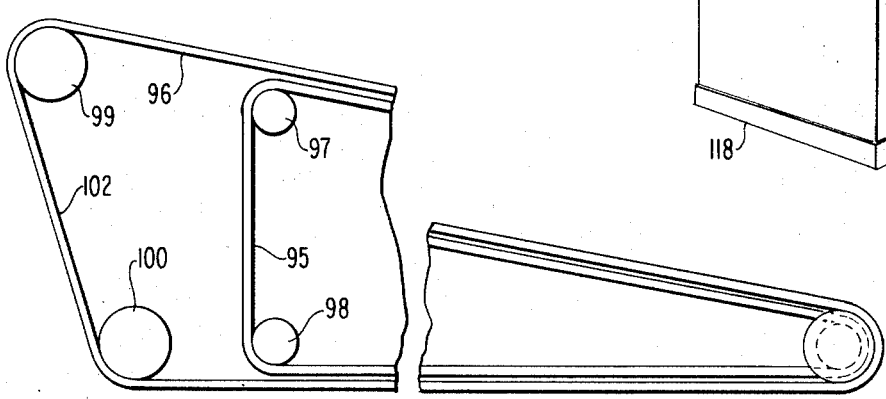

In such drawings:

FIG. 1 is a schematic elevational view of apparatus embodying the invention showing adjustable positioning of a magnetic conveyor means, FIG. 2 is an enlarged view of a portion of FIG. 1 showing relationship of a magnetic conveyor means and a mechanical conveyor means, FIG. 3 is a schematic elevational view of support structure for a magnetic conveyor means which permits contour adjustment of the conveyor means, FIG. 4 is a top plan view of the structure of FIG. 3, FIG. 5 is a perspective assembly view of a portion of the apparatus for supporting a magnetic conveyor means, FIGS. 6 is a schematic plan view of a portion of an embodiment of the invention showing magnetic conveyor means located contiguous to and rearwardly of grass cutting means, FIG. 7 is a schematic plan view of a portion of an embodiment of the invention showing magnetic conveyor means located contiguous to and forwardly of grass cutting means, FIG. 8 is a schematic side view section of an embodiment of the invention showing alternate arrangement of magnetic conveyor means and grass cutting means, FIG. 9 is a schematic plan view of apparatus embodying the invention with conveyor means and hauling means in rear mounted relationship to a vehicle means, FIG. 10 is a rear elevational view of a portion of the apparatus embodying the invention showing means for removal of magnetizable material from the conveyor means, and FIG. 11 is an enlarged detail view with portions omitted of a portion of the apparatus embodying the invention showing means for removal of magnetizable material from the conveyor means, and FIGS. 12 through 14 are schematic views of containers embodying the invention and including materials for making such normally non-magnetic containers magnetizable.

In the embodiment of FIG. 1, a magnetic conveyor arm 20 is shown in side mounted relationship to a hauling vehicle 22. A conveyor arm 20 is connected to vehicle 22 by an interconnecting support which permits the magnetic conveyor arm 20 to be positioned in various angled relationships to the ground as shown in dotted lines. The magnetic conveyor arm 20 can also be positioned below horizontal.

The vehicle 22 includes a hauling compartment 24. A mechanical conveyor 26 interconnects the magnetic conveyor arm 20 and the hauling compartment 24. Alternately, a magnetic conveyor arm can be positioned to empty directly into a hauling compartment.

In practice, magnetic conveyor arm is transported along a roadside, or about any littered area, by a hauling vehicle, such as truck 22. The magnetic conveyor belt, when activated, moves in a direction indicated by arrow 28 with the lower surface 30 of the conveyor arm 20 in sufficiently close relationship to the contour of the area to pick up magnetizable litter. Special provisions to achieve closer positional relationship to land contours and/or to enhance the magnetic force of the magnetic retrieval apparatus will be considered later.

Magnetizable material retrieved along the bottom surface 30 of magnetic conveyor arm 20 is carried to the upper surface 32 by the endless magnetic belt. As shown in FIG. 2 an overlapping relationship between the magnetic conveyor 20 and the mechanical conveyor structure 26 is arranged for receipt of the retrieved material from the upper surface 32.

At the outboard end of the conveyor 20 a support means, such as wheel 34, with level adjustment means 36, is provided. At the inboard end of the conveyor 28 a downwardly-directed, angled path 38 for the conveyor's endless belt is provided by rotary support guide wheel assemblies 40 and 42.

In the embodiment of FIG. 2, material travelling along the upper surface 32 of the magnetic conveyor arm 20 must be removed for delivery to the mechanical conveyor 26 when individual elements 43 of the endless belt are permanent magnets. Without some special removal provisions, the retrieved material could continue rotation about the conveyor arm. The separate removal structures provided may be used individually or in combination, as required. Knocker 44, moving in the direction indicated in FIG. 2, removes a major portion of the retrieved material at a position close to the mechanical conveyor 26. The downwardly-directed angled slope 38 is provided for removal of remaining material. Removal means 46 are located along this slope. Vane means 48 directs material to the mechanical conveyor 26.

Removal means 46 can act mechanically or electrically, or both, to remove material from an endless conveyor belt. Acting mechanically, removal means 46 constitutes a scraper in physical contact with the surface of the endless belt elements. Such scraper, and vane 48, should be made from magnetic shielding material to block the magnetic effect of the endless belt magnets after removal of the retrieved litter.

Alternately, or in combination with a scraper, removal means 46 can comprise an electrical means constituting flux bypass and neutralizing magnetic control means, known in the art, which can be utilized while in contact with the individual elements 43 to cause release.

If electromagnets are used in place of the above described permanent magnets, removal can be simplified since the electromagnets can merely be deactivated during travel along downward slope 38.

Another contribution of the invention which helps indirectly to lessen the removal problem relates to the use of cyclically operated electromagnets carried by conveyor arm 20 inwardly of lower surface 30. Electromagnets 50 are schematically represented in FIGS. 1 and 2. These electromagnets can be operated cyclically from known electrical supply systems, for example, the DC power system of the hauling vehicle with the electromagnets being activated by capacitor build-up and discharge. The object is to cyclically apply and enhance magnetic lifting force to magnetizable litter to raise it from the ground contour and bring it more completely under control of permanent magnets along the endless belt. This supplementation of the lifting force may only be required at selective times or with certain types of terrain or litter materials. With such a supplemental lifting arrangement, the strength of the permanent magnets can be decreased and, in this way, removal at means 46 is more easily accomplished.

An additional contribution of the invention for more efficient retrieval is provision of means to adjust the magnetic conveyor along its length to the contour of the retrieval area. This provision supplements the raising and lowering support provisions shown in FIG. 1 and 2. In FIG. 3 and 4 aspects of this contouring feature and a conveyor means are shown schematically. Conveyor 52 includes two framework branches connected at pivot 58. This connection permits relative movement between framework branch 54 and framework branch 56 with framework branch 56 moving upwardly and downwardly in an upright plane dependent on the rise and fall of the contour being traversed. This articulated framework structure can be ground supported by wheels such as 60 and 62 along its length, as well as being supported along its inboard end by pull bar 64 from the hauling vehicle. A conveyor arm can be subdivided into a greater number of articulated segments than shown and interlocking arrangements for particular land contours can be used. The object is to establish the positioning required for most effective retrieval.

FIG. 5 shows inboard support structure for a conveyor arm. Axle support 68 provides angled adjustment of the inboard end of a conveyor arm to raising of the conveyor arm as shown schematically in FIG. 1. Support arms 69, 70 provide for vertical movement of the inboard support wheel 72 and support frame 74 as required by movement over the contour; also they provide for a fully retracted positioning when the pick-up is not in use.

A significant contribution results from the coaction of grass cutting bar means and magnetic conveyor means as combined in the present invention. Arrangements to bring about this coaction are shown schematically in FIGS. 6 through 8.

As shown schematically in FIG. 6 a magnetic conveyor pick-up arm 76 can be positioned immediately adjacent to and rearwardly of sickle cutting bar means 78. FIG. 7 shows schematically the magnetic conveyor arm 80 positioned forwardly of sickle cutting bar means 82. There are advantages in both types of mountings. With the sickle bar forwardly mounted magnetizable material is loosened so as to make the magnetizable material more readily accessible to the magnetic conveyor means; this is especially adapted to work in tall grass and rough cutting areas. In the embodiment of FiG. 7 the magnetic conveyor means 80 mounted forwardly of the cutting means 82 helps protect the cutting means by prior pick-up of potentially harmful materials. This is especially adaptable to high speed, close clipping operations and would permit use of banks of the reel type lawnmowers for close cropping of littered lawns without damage to the revolving reel or stationary cutter blade.

FIG. 8 shows an arrangement for alternate positioning of magnetic conveyor means, or dual positioning of such means, above cutting bar means 84. The elevation of the rearwardly positioned conveyor can be adjusted. Also, it could be reoriented to operate in a vertical plane in closely spaced relationship to the cutter bar 84 so as to catch any magnetizable material thrown upwardly by the cutter means.

In the embodiment of FIGS. 9 and 10, conveyor arms 86 and 88 are mounted rearwardly of vehicle 90. These conveyor arms empty into a mechanical conveyor 92 which directs retrieved material to a hauling compartment 93 towed rearwardly of the vehicle. The retrieval arms can be positioned with one forward of the other so as to overlap and not leave a gap in the retrieval path.

As shown in FIG. 10 the magnetic conveyor structure includes framework with rotary guide means which define downwardly-directed angled paths 94 and 96 for the endless belts. At these locations on each belt, removal structure is positioned to separate retrieved material from each magnetic conveyor and for delivery to mechanical conveyor 92.

Such separation of retrieved material can be simplified by use of the structure shown in FIG. 11. In that embodiment, the magnets of the magnetic conveyor arm are mounted on magnetic belt 95 which is immediately subsurface to an endless non-magnetic belt 96. The magnets hold the magnetizable materials to the outer belt through a portion of the length of the outer belt as determined by their coextensive travel paths. Guides 97, 98 determine the travel path of the magnetic belt 95 at its inboard end. Guides 99, 100 determine the travel path of the non-magnetic belt at its inboard end. With such an arrangement, the magnetic field need only be operable on the bottom or pick-up surface of the conveyor and until the material is conveyed to the upper surface. The path of the magnets can deviate from the path of the endless non-magnetic anywhere along the upper surface of such endless belt, prior to travel of such endless belt around guide wheel 99. In this way the magnetic force holding the objects to the belt is relieved prior to the downward sope portion 102 and, the objects are readily removed from the belt after separation of the two belts.

The present teachings are inherently applicable for environmental clean up of magnetizable objects. Most beverage containers are made from plated steel or at least include steel as a significant portion of the containers, such as an endwall. Such containers present no problem and are readily susceptible to an automated or mechanized approach as described. However, the invention also includes teachings for manufacturing or fabricating other container products which, previously, were not inherently magnetizable or susceptible to the mechanized retrieval methods taught.

The object is to adapt glass, and other container materials such as paper laminates, and plastic, to mechanized retrieval. The invention teaches embedding of magnetizable material in the container material or affixing magnetizable material to a container during fabrication. As shown in FIG. 12, a magnetizable material 104 can be embedded in the glass or plastic forming the container 106. Suitable magnetizable materials can be, dependent on the product, in the form of chips, flakes, or powder, such as iron, steel, and the like, or more suitably for most consumer products a ferrite material such as a magnetic iron oxide. Either fine metal particles or powdered ferrite material can be readily cast with the glass during formation of a container without impairing the casting process or the product. As an alternative, or in combination, a magnetizable material such as a steel foil label 108 can be used with the glass container 106.

FIG. 13 shows another embodiment in which an easy open container cap structure for container 110 includes a readily removable portion 112 and remaining collar 114. In accordance with the teachings of the invention, the remaining collar 114 can comprise or be made to comprise a magnetizable material. Both portions of the cap structure could be coated with a magnetizable material to assure retrieval. Ring collar 114 can be used in combination with the magnetizable structure of FIG. 12 as required, dependent on the weight of the container, to bring the magnetizable material to required proportions for practical mechanized retrieval purposes.

Referring to FIG. 14, a teaching of the invention for rendering paper or plastic containers, such as milk cartons, magnetizable consists of using a steel foil laminate on edges, e.g. along top edge 116 and along bottom edge 118 during fabrication of container 120.

In disclosing the invention specific structures, steps, and products have been described. With this disclosure as background other equivalent structures and positional relationships, steps, and products than those set forth should be available without departing from the scope of the invention. Therefore, in determining the scope of the invention, reference should be had to the appended claims.

I claim:

1. Environmental clean up apparatus for mechanized retrieval of magnetizable materials, such as metal cans, containers, and the like, comprising
    elongated magnetic conveyor means including magnetic endless belt means mounted for movement to provide retrieval and removal of magnetizable materials from a retrieval area,
    vehicle means supporting said conveying means for transporting the elongated magnetic conveyor means over the retrieval area with a working run of the magnetic endless belt in close positional relationship to the retrieval area being traversed,
    litter receptacle means associated with and transported by the vehicle means,
    means interconnecting the elongated conveyor means and vehicle means for activating the magnetic endless belt means, and
    means for removing retrieved material from the magnetic endless belt means for delivery to the litter receptacle means.

2. The apparatus of claim 1 in which the magnetic endless belt means carries a plurality of magnetic elements in closely spaced relationship along its length.

3. The apparatus of claim 2 in which the plurality of magnetic elements are permanent magnets.

4. The apparatus of claim 1 in which the elongated magnetic conveyor means comprises articulated interconnected segments movable relative to one another in an upright plane permitting positional adjustment of the elongated magnetic conveyor means along its length to the contour of the retrieval area.

5. The apparatus of claim 1 in which the elongated magnetic conveyor means are positioned to extend in substantially transverse relationship to the intended direction of movement of the vehicle means over the retrieval area.

6. The apparatus of claim 5 in which such magnetic conveyor means includes a plurality of elongated magnetic conveyors for delivering retrieved material to the litter receptacle means associated with the vehicle means.

7. The apparatus of claim 1 including mechanical conveyor means adapted to receive the material removed from the magnetic endless belt means for delivery to the litter receptacle means associated with the vehicle means.

8. The apparatus of claim 1 in which such means for removing retrieved material comprises mechanically operable pick-off vane means positioned adjacent to and at a substantial angle to the direction of movement of the endless belt magnetic means at a position where the magnetic endless belt means is travelling in a downwardly direction to permit material removed from the magnetic endless belt means to travel downwardly under the force of gravity.

9. The apparatus of claim 1 in which such means for removing retrieved material includes means for magnetically releasing retrieved material.

10. The apparatus of claim 2 including selectively operable electromagnet means.

11. The apparatus of claim 10 including means for periodic operation of the electromagnet means to provide enhanced magnetic pick-up force.

12. The apparatus of claim 3 in which electromagnet means are positioned along the magnetic endless belt means to confront the retrieval area with a magnetic pick-up force and are periodically operable to increase magnetic pick-up force on magnetizable items in the retrieval area to bring such items under control of such permanent magnets.

* * * * *